United States Patent [19]

Held et al.

[11] 4,168,627

[45] Sep. 25, 1979

[54] WHEEL MOUNTING APPARATUS

[75] Inventors: Ludwig Held; Eickhart Goebel, both of Pfungstadt, Fed. Rep. of Germany

[73] Assignee: Gebr. Hofmann GmbH & Co. KG Maschinenfabrik, Darmstadt, Fed. Rep. of Germany

[21] Appl. No.: 872,113

[22] Filed: Dec. 22, 1977

[30] Foreign Application Priority Data

Jan. 15, 1977 [DE] Fed. Rep. of Germany ....... 2701534

[51] Int. Cl.² .............................................. G01M 1/06
[52] U.S. Cl. ..................................................... 73/487
[58] Field of Search ................. 73/484, 487, 459, 460, 73/480; 144/288 A

[56] References Cited

U.S. PATENT DOCUMENTS

| | | | |
|---|---|---|---|
| 2,567,597 | 9/1951 | Currier | 73/484 |
| 2,592,804 | 4/1952 | Holl | 73/484 |

FOREIGN PATENT DOCUMENTS 2424668  4/1975  Fed. Rep. of Germany ............. 73/480

*Primary Examiner*—James J. Gill
*Attorney, Agent, or Firm*—Cushman, Darby & Cushman

[57] ABSTRACT

Apparatus for mounting and centering a wheel on a mounting spindle of a testing machine, including a shaft portion, a centering taper member on the shaft portion for engaging a center hole in a wheel to be mounted, a fixing nut which can be screwed on the shaft portion for pressing the wheel against the centering taper member for centering the wheel, a spring operable to urge the taper member towards the nut, a housing member on the shaft portion around a part of the spring, a covering means covering the spring for protection thereof, the covering means being disposed on the shaft portion and at least partly in the housing member, and means for limiting the movement of the spring towards a fully relaxed condition thereof thereby to maintain a prestressing in the spring.

5 Claims, 1 Drawing Figure

U.S. Patent     Sep. 25, 1979     4,168,627
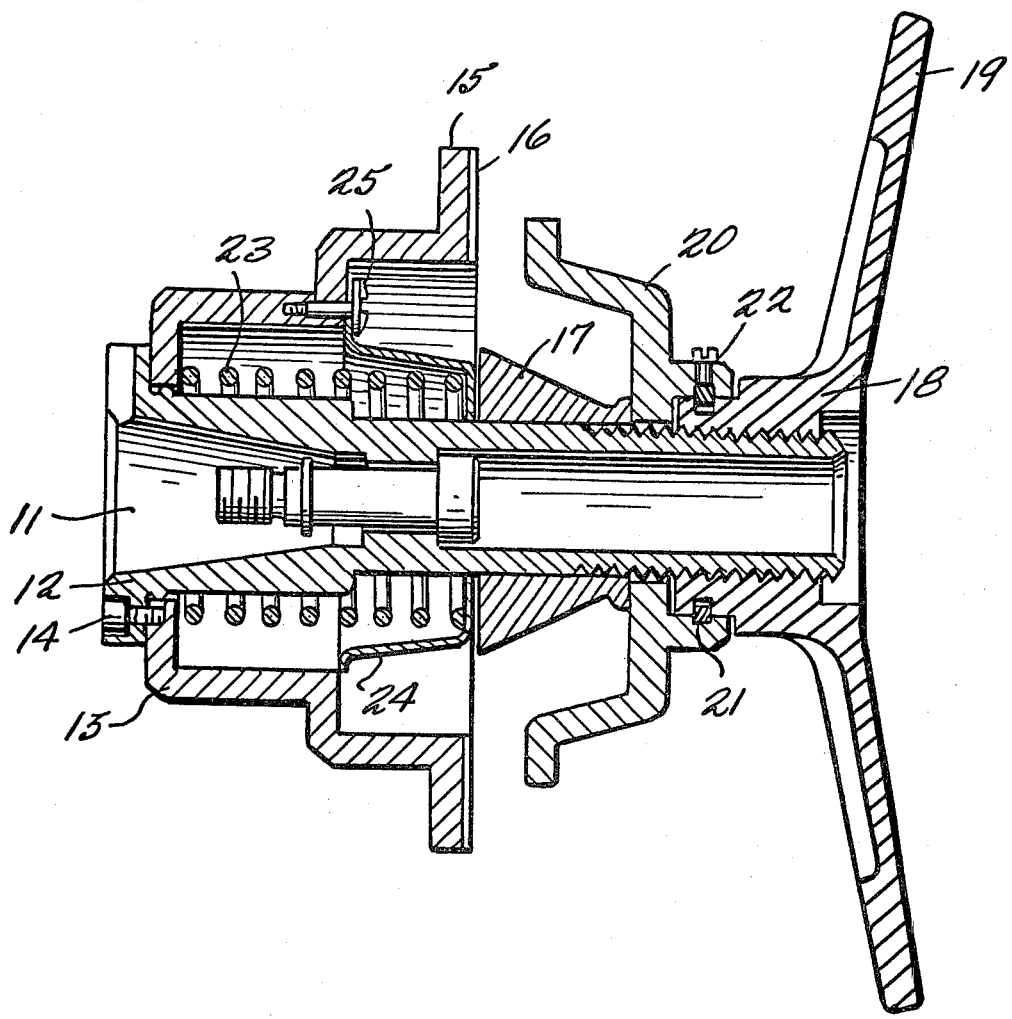

WHEEL MOUNTING APPARATUS

The invention relates to apparatus for mounting a motor vehicle wheel on a mounting spindle of a testing machine.

Apparatus for this purpose has been proposed, comprising a centering taper member which is pressed into a center hole in the wheel, by means of a compression spring, and a fixing nut which bears against the wheel to clamp it firmly in place. The spring is disposed between the taper member and an abutment surface, but it is exposed to external influences, completely without protection, so that, e.g., dirt or moisture or other fouling matter such as metal turnings can severely impair operation of the apparatus. However, wheel testing machines are usually set up in areas, for example garages, in which such external influences cannot be entirely excluded.

In addition, there is no means for limiting the relief of stress in the compression spring so that when removing a motor vehicle wheel from the mounting spindle, the compression spring together with centering taper member may jump completely off the mounting spindle, which may result in damage to the taper member.

In addition, when the operator of the testing machine is clamping the motor vehicle wheel by means of the nut, he must work against the compression spring force, making the fixing operation complicated and strength-sapping, as well as requiring a long screw-threaded portion for receiving the nut, in order to achieve the necessary centering and clamping force.

According to the invention, there is provided apparatus for mounting and centering a wheel on a mounting spindle of a testing machine, including a shaft portion, a centering taper member on the shaft portion for engaging a center hole in a wheel to be mounted, a fixing nut which can be screwed on the shaft portion for pressing the wheel against the centering taper member for centering the wheel, a spring operable to urge the taper member towards the nut, a housing member on the shaft portion around a part of the spring, a covering means covering the spring for protection thereof, the covering means being disposed on the shaft portion and at least partly in the housing member, and means for limiting the movement of the spring towards a fully relaxed condition thereof thereby to maintain a pre-stressing in the spring.

The present invention also provides apparatus for mounting and centering a wheel on a mounting spindle of a testing machine, including a housing member with means for fixing the housing member on the spindle, a centering taper member which in use of the apparatus is disposed on the spindle for engaging a center hole in a wheel to be mounted thereon, a fixing nut which in use is screwed on the spindle for pressing the wheel against the taper member to center the wheel, a spring disposed at least in part in the housing member and operable to urge the taper member towards the nut, a covering means covering the spring for protection thereof, the covering means being disposed at least partly in the housing member, and means for limiting the movement of the spring towards a fully relaxed condition thereof, thereby to maintain a pre-stressing in the spring.

Apparatus according to the present invention will now be described by way of example with reference to the accompanying drawing which shows a side view in cross-section of the apparatus, illustrating parts of two taper members of different diameters and parts of two support flange members also of different diameters.

Reference numeral 11 denotes a mounting spindle of a wheel testing machine (not shown) while reference numeral 12 denotes a mounting shaft portion of the wheel mounting apparatus. Shaft portion 12 is fixed on spindle 11 by any suitable means (not shown in detail). The apparatus also has housing tube portion 13 of a stepped configuration, which is secured by screw members 14 to the rearward end of shaft portion 12. At its other or forward end, tube portion 13 is formed as support flange 15 which has radial splining or corrugations 16 against which a wheel is clamped during use of the apparatus, as will be described below, in order to ensure phase-true drive for the wheel during a measuring or testing run.

Centering taper member 17 is axially displaceably carried on shaft 12. The diameter of taper member 17 will vary according to the type of motor vehicle wheel to be carried on the apparatus, and more specifically, the diameter of the central hole in the wheel, into which taper member 17 engages for mounting and centering the wheel.

Provided on the forward or right-hand end portion of shaft 12 is a screw-thread onto which fixing nut 18, which is preferably in the form of a wing nut with wings 19, can be screwed.

The apparatus also has support flange member 20, which will also vary slightly in construction as a function of wheel size, as is obvious to those skilled in the art. Flange member 20 fits on shaft 12 so as to be readily displaceable thereon, and is connected to nut 18 in such a way as to permit relative rotary movement while preventing relative axial movement. As shown, this connection is by means of sliding blocks 21 secured to flange member 20 by screws 22 and received in an annular groove in nut 18.

Disposed between the left-hand end of housing tube portion 13 and centering taper member 17 is spring 23 shown as a pre-stressed cyclindrical or coil compression spring. The pre-stressing of spring 23, as will be described below, is at least of such a magnitude that at the beginning of a wheel mounting operation spring 23 applies a minimum axial force to the centering taper member 17 such that taper member 17 transfers and exerts radial forces against the wheel being mounted greater than the weight of the wheel and the frictional force between flange member 20 and the wheel to be secured by the apparatus.

This provides that the motor vehicle wheel will be pressed against flange member 20 by means of taper member 17, and the wheel is prevented from sliding or sagging down under its own weight, which would cause a centering error.

The apparatus further has cap or hood 24 which fits partly over compression spring 23. Hood 24 is shown as a bell-like configuration, one end being mounted on the shaft 12 and the other end being disposed within the tube portion 13. The hood 24 is axially displaceable relative to the shaft 12 and the tube portion 13. The hood 24 is provided to protect the compression spring 23, in any position of the spring 23, from outside influences such as dirt, moisture or other fouling matter, which could cause premature wear of the spring and an undesirable change in the spring force, or tipping of the spring 23.

So that the operator, in applying a wheel to the apparatus, does not work against the action of the compression spring 23 from the beginning of the wheel-mounting operation, the apparatus also has a means for limiting the stress relief of the spring, to ensure that the spring 23 is always pre-stressed to a given minimum force. The limiting means is shown in the form of at least one, preferably adjustable, screw member 25 screwed in the tube portion 13, with the screw head projecting inwardly into the path of movement of the outer edge of the head 24. When no wheel is clamped in the apparatus, the outer edge of the hood 24 thus bears against the screw head 25, which will prevent the compression spring 23 and thus possibly the taper member 17 from being pushed off the mounting shaft 12.

This arrangement further provides that, after the motor vehicle wheel has been pushed onto shaft 12 and nut 18 has been tightened to cause flange member 20 to bear against the wheel, taper member 17 engages into the central hole of the wheel with the necessary spring force immediately at the beginning of the nut-tightening operation, thereby avoiding centering errors.

Centering taper member 17 is preferably made of high-grade noncorroding material, and the surface of the taper member is very finely machined. This is intended to provide that the coefficient of friction between the wheel and the centering taper member is kept at the minimum possible level so that when the wheel is being tightened in place by nut 18, there are substantially no centering errors due to roughness, rust on the surface of the taper member or by wear phenomena such as grooves and the like.

Although only one exemplary embodiment of this invention has been described in detail above, those skilled in the art will readily appreciate that many modifications are possible in the exemplary embodiments without materially departing from the novel teachings and advantages of this invention. For example, although the above-described apparatus has shaft portion 12, it would be possible to omit this. Housing tube portion 13, spring 23, taper member 17, flange member 20, and nut 18, would then be fitted directly on mounting spindle 11 of the machine, portion 13 having fixing means for this purpose and the end of spindle 11 being screw-threaded to receive nut 18. Accordingly, all such modifications are intended to be included within the scope of this invention as defined in the following claims.

What is claimed is:

1. Apparatus for mounting and centering a wheel on a mounting spindle of a testing machine comprising:
    a shaft portion to be mounted on said machine mounting spindle;
    a centering taper member on said shaft portion for engaging a center hole in said wheel to be mounted;
    a fixing nut which can be screwed on said shaft portion for pressing said wheel against said centering taper member so as to center said wheel, said firing nut including a support flange member to be pressed by said nut against said wheel;
    a spring, on said shaft portion, operable to urge said taper member against said wheel as said wheel is pressed against said taper member by operation of said fixing nut;
    a housing member on said shaft portion around a part of said spring;
    covering means covering said spring for protection thereof, said covering means being disposed on said shaft portion and at least partly in said housing member; and
    means for limiting the movement of said spring towards a fully relaxed condition thereof thereby maintaining a pre-stressing in said spring, said limiting means being adjustable so that at the beginning of a wheel clamping operation the minimum spring force urging said taper member against said wheel to be mounted is sufficient to cause centering taper member to exert a force against said wheel greater than the weight of said wheel and the frictional force between said wheel and said support flange member of said nut.

2. Apparatus according to claim 1 wherein said spring is a cylindrical compression spring;
    said nut comprises a support flange member to be pressed by said nut against said wheel; and
    said limiting means is adjustable so that at the beginning of a wheel clamping operation the minimum spring force component in the radial direction is greater than the weight of said wheel to be mounted and the frictional force between said wheel and said support flange member.

3. Apparatus according to claim 1, wherein said limiting means comprises at least one pre-adjustable screw member carried by said housing member for adjusting the pre-stressing in said spring.

4. Apparatus according to claim 1 wherein the taper member comprises high-grade noncorroding material and has a very finely worked surface for engaging the wheel to be centered thereby.

5. Apparatus for mounting and centering a wheel on a mounting spindle of a testing machine comprising:
    a housing member fixed on said spindle;
    a centering taper member disposed on said spindle, for engaging a center hole in said wheel to be mounted thereon;
    a fixing nut which can be screwed on said spindle, for pressing said wheel against said taper member to center said wheel, said fixing nut including a support flange member to be pressed by said nut against said wheel;
    a spring disposed at least in part in said housing member and operable to urge said taper member against said wheel as said wheel is pressed against said taper member by operation of said fixing nut;
    a covering means covering said spring for protection thereof, said covering means being disposed at least partly in said housing member; and
    means for limiting the movement of said spring towards a fully relaxed condition thereof, thereby maintaining a pre-stressing in said spring, said limiting means being adjustable so that at the beginning of a wheel clamping operation the minimum spring force urging said taper member against said wheel to be mounted is sufficient to cause centering taper member to exert a force against said wheel greater than the weight of said wheel and the frictional force between said wheel and said support flange member.

* * * * *